United States Patent
Kerschgens Long

(10) Patent No.: US 8,220,578 B2
(45) Date of Patent: Jul. 17, 2012

(54) CONSTRUCTION KIT AND METHOD FOR CONVERTING A BICYCLE, AND BICYCLE

(76) Inventor: Johann Joseph Kerschgens Long, Vienna (AT)

(*) Notice: Subject to any disclaimer, the term of this patent is extended or adjusted under 35 U.S.C. 154(b) by 375 days.

(21) Appl. No.: 12/449,039

(22) PCT Filed: Jun. 5, 2007

(86) PCT No.: PCT/AT2007/000273
§ 371 (c)(1),
(2), (4) Date: Jul. 21, 2009

(87) PCT Pub. No.: WO2008/089499
PCT Pub. Date: Jul. 31, 2008

(65) Prior Publication Data
US 2010/0001488 A1    Jan. 7, 2010

(30) Foreign Application Priority Data
Jan. 22, 2007 (AT) .................... A 103/2007

(51) Int. Cl.
  *B62M 6/65* (2010.01)
  *B62M 6/60* (2010.01)
  *B62M 6/40* (2010.01)
  *B62M 6/25* (2010.01)
  *B62M 1/00* (2010.01)

(52) U.S. Cl. ............... 180/206.6; 180/205.5; 180/206.1; 180/206.5; 280/230

(58) Field of Classification Search ........... 280/230; 180/205.1, 205.2, 205.5, 205.7, 206.1, 206.5, 180/206.8
See application file for complete search history.

(56) References Cited

U.S. PATENT DOCUMENTS

| | | | | |
|---|---|---|---|---|
| 1,798,384 A * | 3/1931 | Roberds | ........... | 280/260 |
| 2,109,983 A * | 3/1938 | Woodard | ........... | 192/217.6 |
| 4,966,419 A * | 10/1990 | Cunard | ........... | 301/2.5 |
| 5,015,869 A * | 5/1991 | Schurmann et al. | ........... | 290/1 R |
| 5,577,748 A * | 11/1996 | Dombrowski et al. | ........... | 280/244 |
| 7,828,101 B2 * | 11/2010 | Radtke et al. | ........... | 180/206.5 |
| 2004/0065495 A1 * | 4/2004 | Huang | ........... | 180/220 |

FOREIGN PATENT DOCUMENTS

DE    94 16 058    12/1994

(Continued)

OTHER PUBLICATIONS

International Search Report.

*Primary Examiner* — Lesley D. Morris
*Assistant Examiner* — Daniel Yeagley
(74) *Attorney, Agent, or Firm* — Collard & Roe, P.C.

(57) ABSTRACT

A kit can convert a non-driven wheel of a bicycle into a wheel driven by drive. The wheel includes a hub for rotatably receiving an axle the axle being mountable between the fork blades of a fork. A bicycle has a wheel converted to be driven by a drive in this manner. A method includes steps for converting a bicycle in this manner using the kit. The kit includes two supports mountable at the outer face of a fork blade having elements for being coupled with a fork blade, respectively. The supports include bearings, respectively, for rotatably receiving at least one shaft. The at least one shaft is connectable in co-rotation with the wheel to be driven. Furthermore, an arrangement for coupling at least one shaft to the drive is provided.

21 Claims, 9 Drawing Sheets

FOREIGN PATENT DOCUMENTS

| | | |
|---|---|---|
| DE | 298 13 247 | 11/1998 |
| DE | 101 27 769 | 12/2002 |
| DE | 20 2006 014 533 | 11/2006 |
| GB | 23069 | 0/1910 |
| JP | 2004142631 A * | 5/2004 |
| KR | 2006086606 A * | 8/2006 |
| WO | WO 03/084803 | 10/2003 |
| WO | WO 2006/124543 | 11/2006 |

* cited by examiner

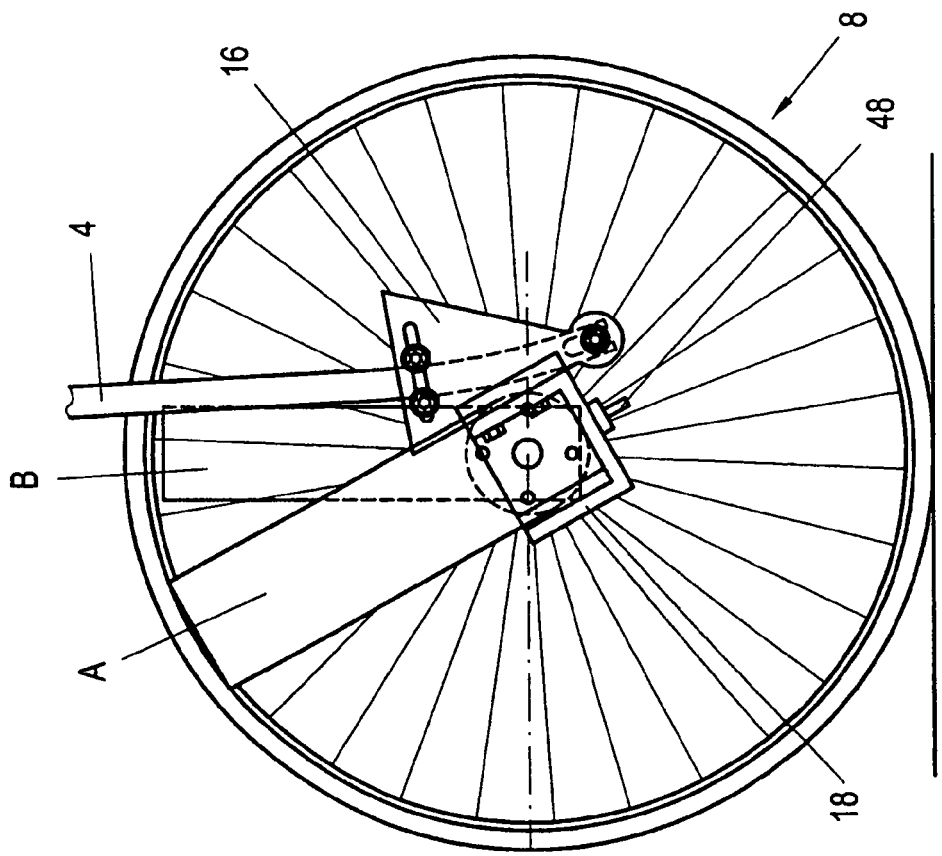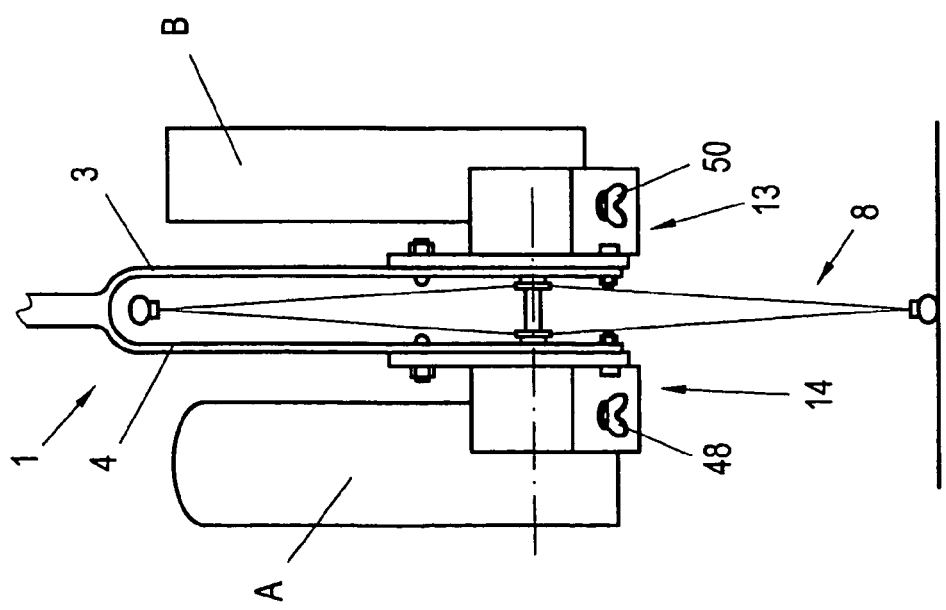

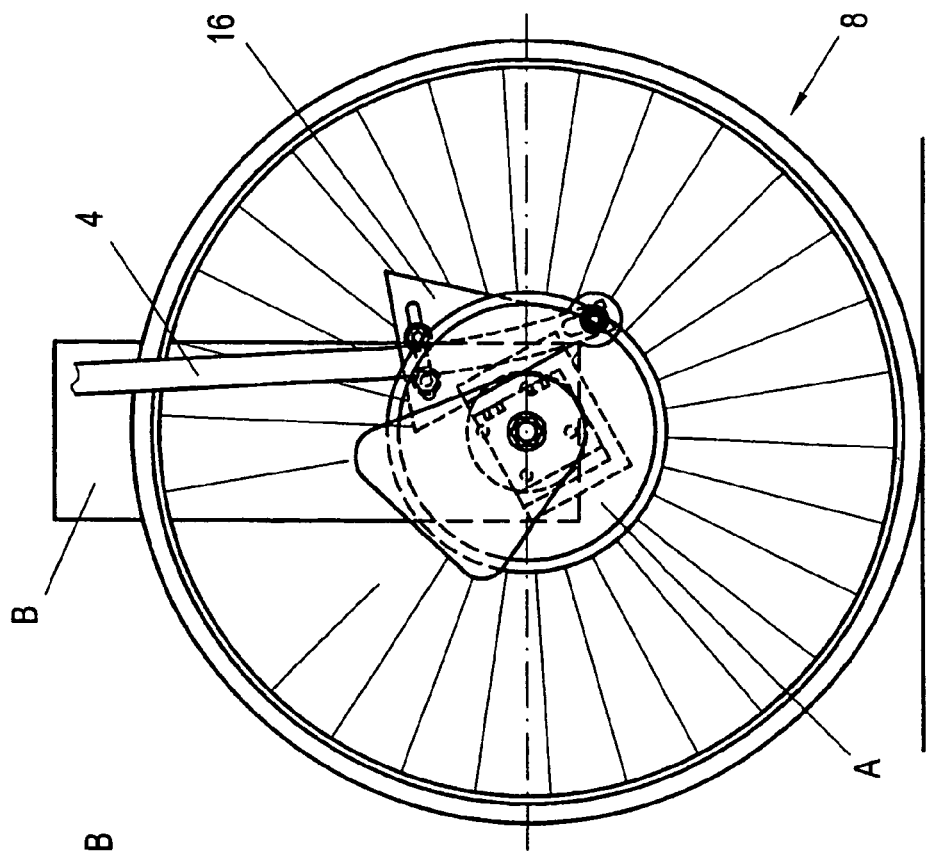
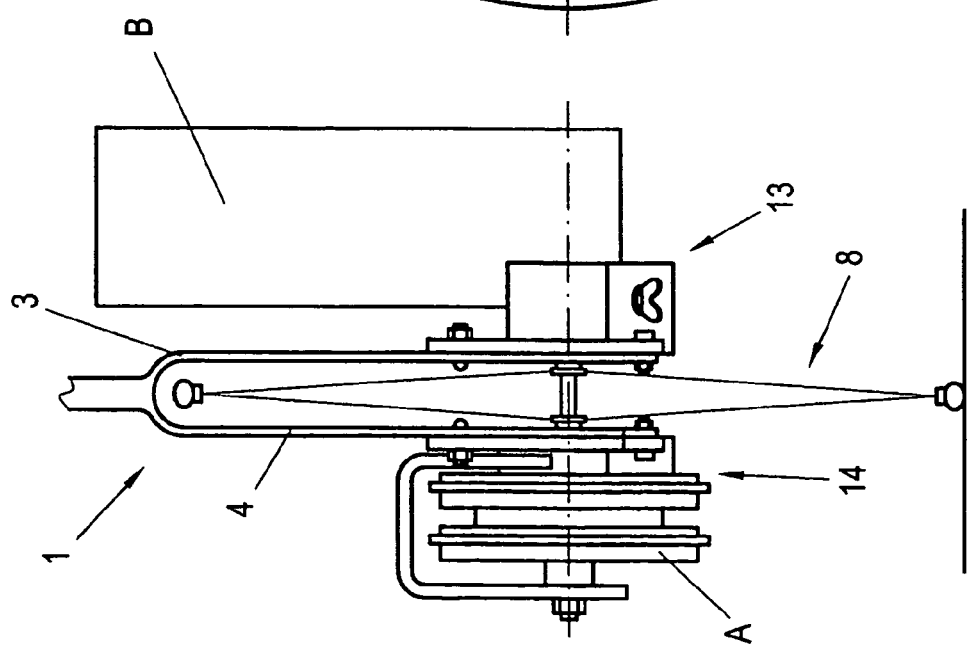
Fig. 11
Fig. 12

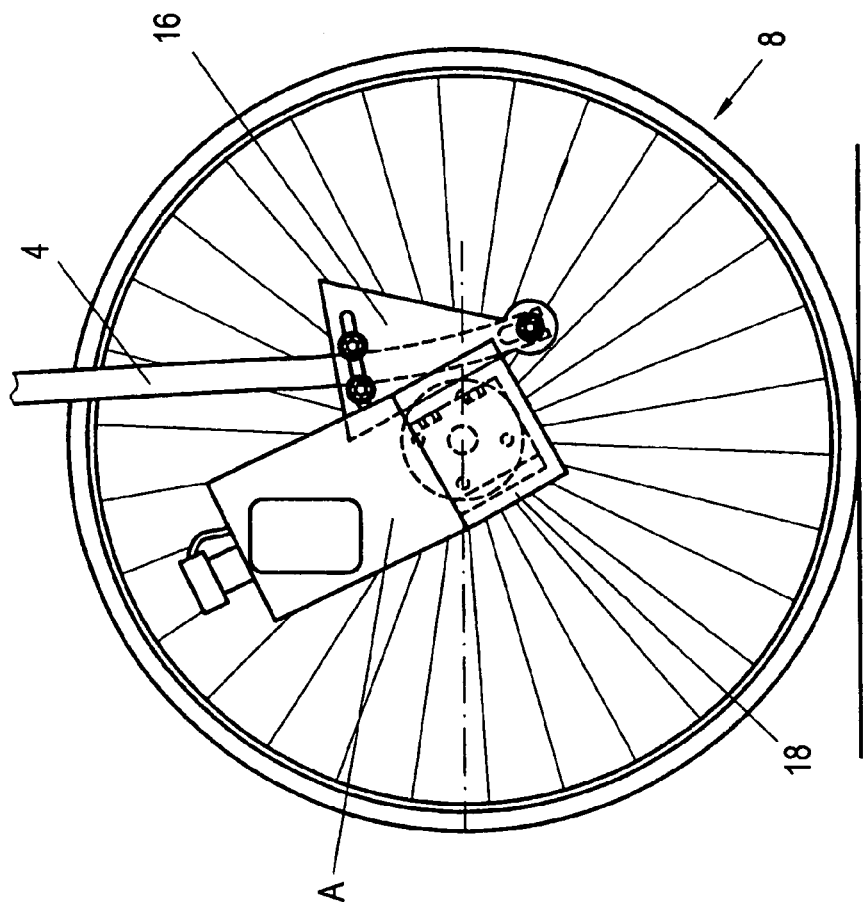
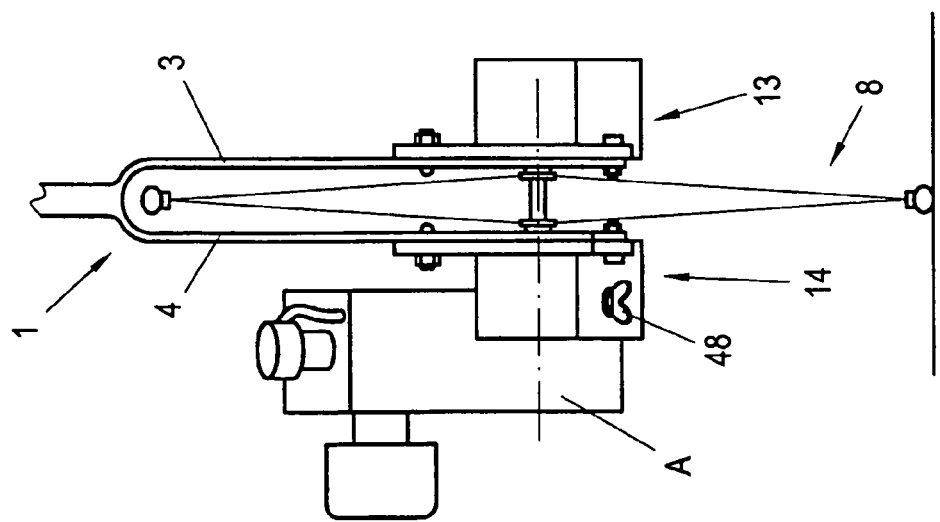

CONSTRUCTION KIT AND METHOD FOR CONVERTING A BICYCLE, AND BICYCLE

CROSS REFERENCE TO RELATED APPLICATIONS

This application is the National Stage of PCT/AT2007/000273 filed on Jun. 5, 2007, which claims priority under 35 U.S.C. §119 of Austrian Application No. A 103/2007 filed on Jan. 22, 2007. The international application under PCT article 21(2) was not published in English.

The invention relates to a kit for converting a non-driven wheel of a bicycle into a wheel driven by means of a drive, the wheel comprising a hub for rotatably receiving an axle being mountable between the fork blades of a fork.

Furthermore, the invention relates to a bicycle comprising at least one non-driven wheel and at least one drive.

Finally, the present invention relates to a method of converting a non-driven wheel of a bicycle into a wheel driven by means of a drive, the wheel comprising a hub for rotatably receiving an axle being mountable between the fork blades of a fork.

Primarily, the present invention relates to a kit for converting bicycles with an electric drive, preferably. In general, it is not important whether the bicycle has one wheel, two, three or multiple wheels. The kit according to the invention provides pedal-driven vehicles with an additional driving force.

Motor-assisted bicycles are known, in which, according to an alternative, a roller driven by a petrol engine rotates the front wheel by means of friction. However, it is relatively complicated to engage or disengage the clutch of the motor while being in motion.

DE 10 127 769 A1 describes a bicycle having an auxiliary electric drive, where an electric motor can be connected to the hub of the rear wheel by means of a planetary wheel gear. The construction requires a hub of the rear wheel designed in a relatively complex way, and therefore cannot be used for converting bicycles.

Further, DE 94 16 058 U1 describes an electric bicycle, where an electric motor is connected to the hub of the rear wheel by means of a specific gear. However, also this construction is designed in a relatively complex way, and due to the effect on the rear wheel it is difficult to be used for converting a bicycle.

Furthermore, typical auxiliary drives for bicycles are relatively place-consuming and heavy in weight, presenting a disadvantage when handling the bicycle without the assistance of the motor.

Therefore, it is an object of the present invention to provide for a conversion kit as mentioned above for converting a non-driven wheel of a bicycle with a drive, which can be mounted in a fast and simple way. The kit shall consist of as few parts as possible having a simple structure, shall be cost-effective and the weight shall be as low as possible.

It is another object to create a bicycle, which can fast and easily be provided with a drive. Furthermore, it shall be possible to restore the original construction of the bicycle in a fast and easy way.

Finally, it is another object of the invention to provide for a simple and fast method to converse a non-driven wheel of a bicycle into a wheel driven by a drive.

The first object is achieved by means of the kit mentioned above, which comprises two supports arrangeable at the outer face of a fork blade, respectively, having elements for connection with the fork blades, respectively, the supports each comprising a bearing in order to rotatably receive at least one shaft, the at least one shaft being connectable in co-rotation with the wheel to be driven, and which further comprises a means for coupling at least one shaft to the drive. The kit comprises only a few parts having a simple structure allowing for converting a non-driven wheel of a bicycle with a drive in a fast and cost-efficient manner. The kit consists of at least one shaft to be connected in co-rotation with the wheel to be driven, and two bearings located in supports arranged on either side of the fork for receiving the at least one shaft. Finally, the drive is connected accordingly with the at least one shaft being rotatably arranged in the bearings. Electric motors as well as combustion engines can be used as drive. The conversion kit can be produced at low cost and is of very low weight. The corresponding drives can be chosen depending on the application, in consideration of power and size.

Preferably, each support consists of a fork support being connectable with the fork blade and a shaft support being detachably coupled thereto. The fact that the support consists of two parts simplifies the mounting, especially when arranging the at least one shaft in the bearing, which is placed in the shaft support.

The fork support and the shaft support are preferably coupled by means of screws. Nevertheless, other coupling techniques can be used, particularly techniques not requiring the use of tools.

Also, the elements for connecting the support or the fork support and the fork blade can be built as at least one screw connection. For example, a bore hole can be arranged at the support or the fork support through which a corresponding screw can be placed, which can be arranged through the opening on the fork of the bicycle typically being provided for receiving the axle of the bicycle.

Furthermore, an element for connecting the support or fork support and the fork blade can be in the form of a U-shaped fork clamp with threaded ends for being detachably coupled to nuts. An elongated hole can be provided on the support or fork support through which the fork clamp surrounding the fork blade can be fastened by means of the nuts. Such a fastening technique allows for moving the support later and for slightly adjusting the rotation axis. This can be necessary for an adjustment to already existing brakes or a mudguard.

The bearings for rotatably supporting the at least one shaft are preferably ball bearings being fixed to the support or shaft support.

According to another feature of the invention an element for detachably mounting the drive is arranged on a support. The drive is fixed by means of the fixing element and is protected against unwanted removal.

In case an electric drive is used, an element for detachably mounting a battery can be provided. Advantageously, the drive is arranged at one side of the wheel to be driven, and the battery is arranged on the opposite side of it.

In order to mount or dismount the drive or the battery easily, the mounting element can be a wing bolt or the like. This also allows for a simple dismounting of the drive and the battery without using tools. When parking the vehicle in public, the drive and the battery can be removed and carried along. Therefore, these components are prevented from being stolen.

According to an embodiment of the invention, a continuous shaft is provided between the bearing of one support and the bearing of a second support. In this case, the shaft replaces the axle originally arranged in the hub of the non-driven wheel.

The shaft and the wheel can be coupled in co-rotation, with the shaft in its centre portion having a polygonal, especially square, cross section, the outer diameter of the shaft in its centre portion being slightly larger than the inner diameter of the hub of the wheel to be driven, and the connection in co-rotation between the shaft and the wheel being realised by means of an interference fit of the shaft in the hub. In this case, the axle and, if necessary, the ball bearings are removed from the hub of the wheel, and the shaft having a polygonal, especially square, cross section is pressed into the hub, such that it is connected in co-rotation with the hub and therefore with the wheel. This provides for a simple and efficient way of converting a non-driven wheel of a bicycle into a driven wheel.

The connection of shaft and wheel in co-rotation can be improved by providing two locating discs comprising a seat for the shaft which corresponds to the polygonal, especially square, cross section, the locating discs having teeth or the like on the side thereof facing the hub for a connection in co-rotation with the hub. The teeth partially penetrate the front side of the hub and thus prevent the locating discs from rotating in relation to the hub.

According to an alternative embodiment, two shafts and two locating discs connectable with the shafts can be provided, the locating discs comprising elements for a connection in co-rotation with the wheel on the side thereof facing the wheel. In this embodiment, the rotational movement of the drive is transmitted to the wheel via the shaft and the locating discs as well as the elements for a connection in co-rotation.

These elements for connecting the shaft in co-rotation with the wheel consist, for example, of a plurality of elements, especially rods, to be arranged between possible spokes of the wheel.

The device for connecting of, i.e. the coupling of, the at least one shaft and the drive can be a driving flange. The driving flange realizes the connection between the shaft and the drive and can be designed differently depending on the type of drive and shaft. Generally, it is not necessary to have a gear box between shaft and drive which allows for significantly reducing the costs and the weight of the conversion kit.

The second object according to the invention is achieved by a bicycle in which the at least one non-driven wheel is driven by the drive of the above mentioned kit.

Preferably, the front wheel of the bicycle is coupled with the drive. In this way, an accessory drive for a bicycle can be realised in a particularly simple way.

The drive preferably consists of an electric motor. The rotational speed of the electric motor can easily be altered by changing the supply voltage of the electric engine.

Moreover, it is also possible to use a combustion engine with the respective fuel supply.

The third object according to the invention is achieved by an above mentioned method comprising removing the non-driven wheel from the fork, fixing two supports each having one bearing on one fork blade of the fork, connecting at least one shaft in co-rotation with the wheel, arranging the at least one shaft coupled to the wheel between the bearings of the supports, and finally connecting the at least one shaft with the drive. The method for converting a non-driven wheel of a bicycle can be carried out in a simple and fast way. The original state of the bicycle can easily be re-established by inversely carrying out the above mentioned steps.

According to an alternative embodiment of the invention, the axle is removed from the hub of the non-driven wheel and a shaft with an outer diameter slightly larger than the inner diameter of the hub is pressed into the hub for connecting the shaft in co-rotation with the wheel.

Alternatively, the axle can be removed from the hub of the non-driven wheel and two locating discs coupled to at least one shaft can be connected in co-rotation with the hub of the wheel.

The present invention is explained in more detail by means of the accompanying drawings, in which:

FIGS. 9 to 14 are front and side views of different embodiments of a bicycle provided with a drive, respectively.

Figure 1:
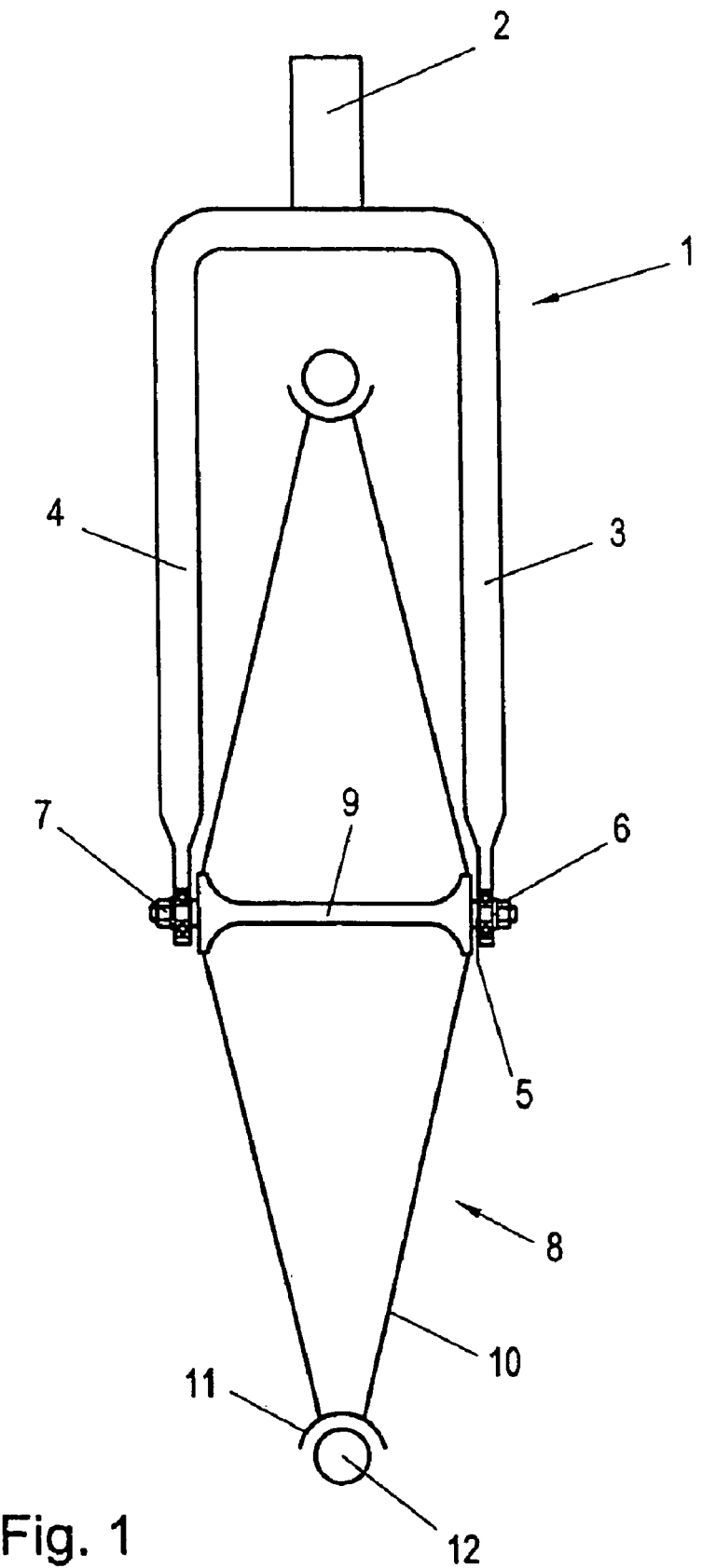
FIG. 1 is a schematic front view of the front wheel of a bicycle.

FIG. 1 is a schematic front view of the front wheel of a bicycle. The fork 1 of the bicycle consists of the fork head 2 and two fork blades 3, 4 at the end of which the axle 5 of the wheel 8, usually the front wheel, is mounted by means of axle nuts 6, 7. The axle 5 is supported rotatably in the hub 9 by means of corresponding ball bearings (not shown). Spokes 10, the rim 11 and finally the tyre 12 are mounted subsequently to the hub 9. This non-driven wheel 8, usually the front wheel, can be removed from the bicycle in a fast and simple way, such that it is particularly suited for being converted to a wheel 8 driven by drive A.

Figure 2:
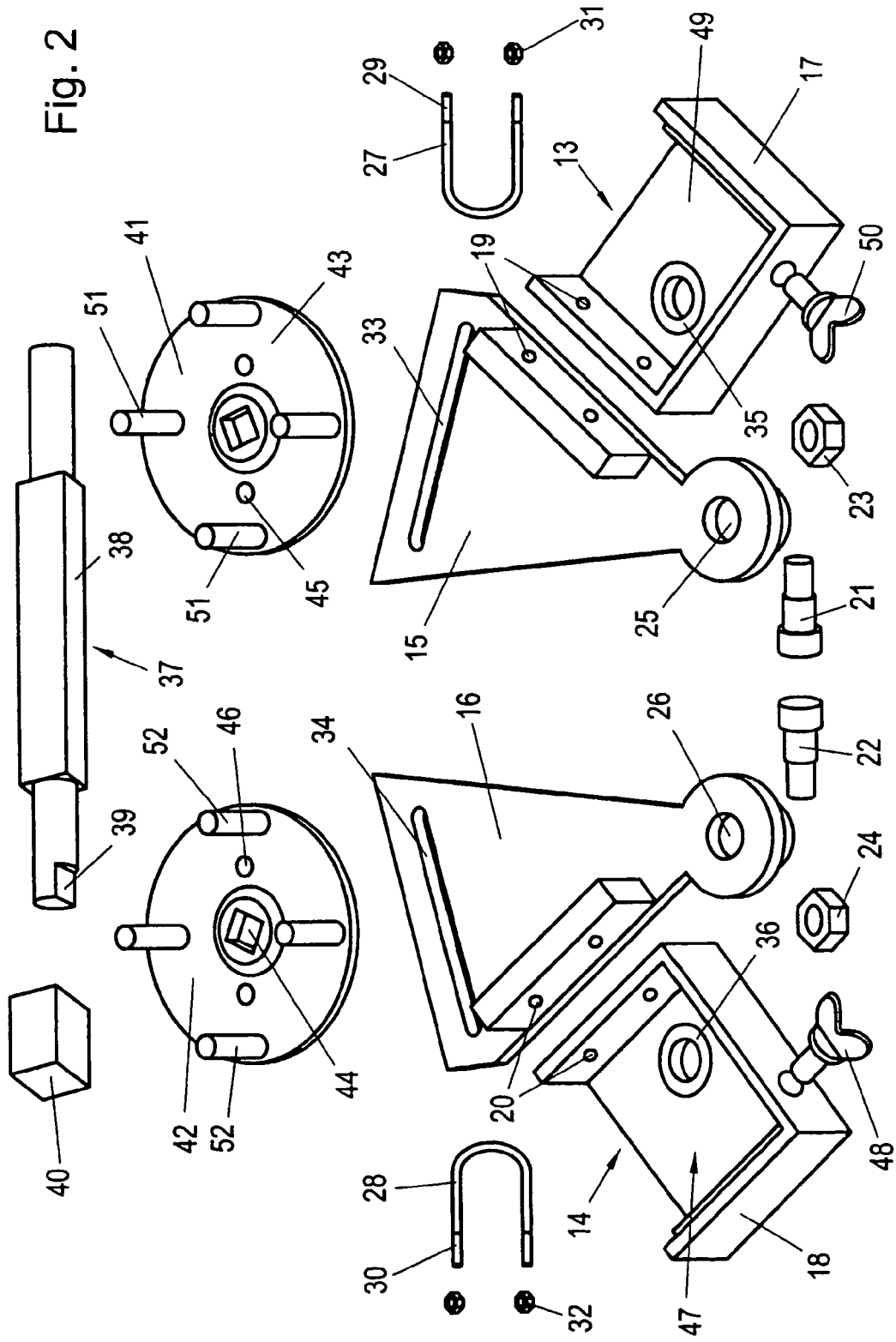
FIG. 2 shows an embodiment of the conversion kit according to the invention, the components being disassembled.
Figure 3:
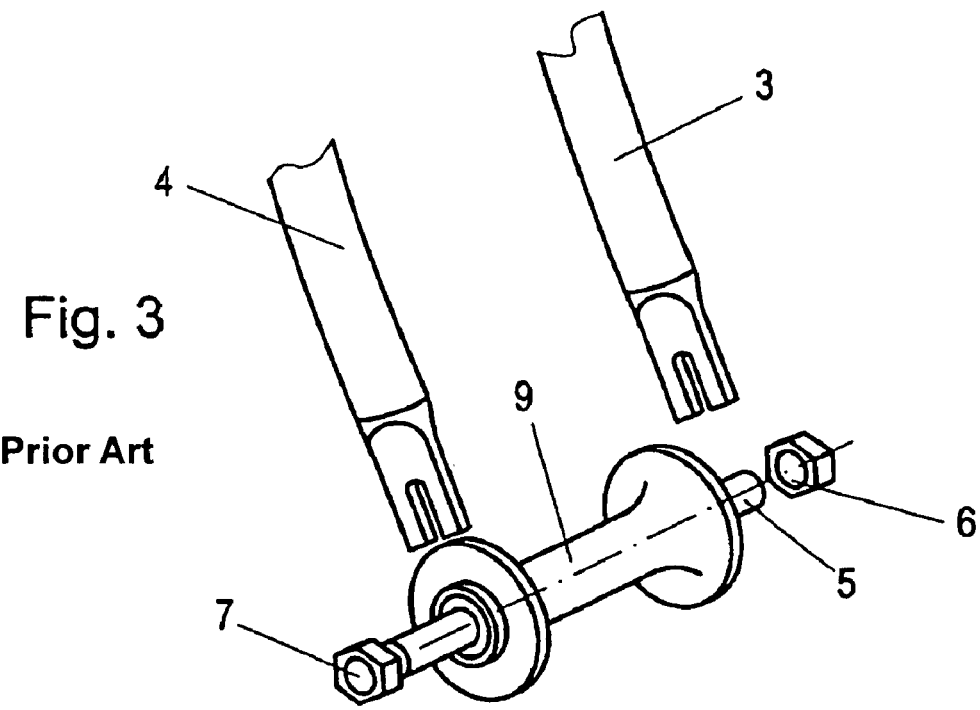
FIGS. 3 to 6 are several views of the front wheel of the bicycle during converting.

FIG. 2 shows an embodiment of the conversion kit according to the invention, the components being disassembled. The conversion kit consists of two supports 13, 14, in this embodiment each comprising a fork support 15, 16 and a shaft support 17, 18 detachably connectable thereto. The connection of the fork supports 15, 16 and the shaft supports 17, 18 is preferably realised by means of screws (not shown), which are inserted through bore holes 19, 20.

The fork supports 15, 16 are connected with the fork blades 3, 4, of fork 1 of the bicycle by means of appropriate connecting elements. In the embodiment shown, the fork supports 15, 16 are fixed to the fork blades 3, 4 by means of screws 21, 22 and corresponding nuts 23, 24. Therefore the screws 21, 22 are introduced through respective openings 25, 26 of the fork supports 15, 16 into the groove at the end of the fork blades 3, 4 typically provided for the axle 5 of wheel 8. A corresponding coupling is realised by means of nuts 23, 24. Additionally, further connecting elements can be provided, for example U-shaped fork clamps 27, 28. The fork clamps 27, 28 are provided with threaded ends 29, 30 for being detachably coupled to corresponding nuts 31, 32. The fork clamps 27, 28 surround the fork blades 3, 4 and are placed through an elongated hole 33, 34, arranged accordingly, in the fork support 15, 16 and are fixed by means of nuts 31, 32. The elongated hole 33, 34 in the fork support 15, 16 enables the fork support to pivot around the screws 21, 22 in the bore holes 25, 26 and therefore to adjust the fork support 15, 16 in relation to the fork 1 of the bicycle.

The supports 13, 14 each comprise a bearing 35, 36 for rotatably supporting at least one shaft 37. In case the supports 13, 14 each consist of two pieces, as represented, the bearing 35, 36 is located in the shaft support 17, 18, respectively. The bearings 35, 36 are preferably ball bearings, as typically used with bicycles.

In the example shown, only one shaft 37 is provided which, once being assembled, extends from bearing 35 of support 13 or shaft support 17 to bearing 36 of the second support 14 or shaft support 18. In its center portion 38, the shaft 37 comprises a polygonal, especially square, cross section destined to transmit the rotational movement to wheel 8 of the bicycle. The shaft 37 has one end comprising a notch 39 or the like for connecting drive A (not shown) by a coupling device such as corresponding driving flange 40.

Furthermore, two locating discs 41, 42 are provided, each having a seat 43, 44 for the shaft 37 corresponding to the polygonal, especially square, cross section in the centre portion 38. The locating discs 41, 42 have teeth 45, 46 or the like on the side thereof facing hub 9 of wheel 8 to be driven, destined for the connection in co-rotation with hub 9. Elements, especially rods 51, 52, can be arranged at the locating discs 41, 42, which, when assembled, extend into the spokes 10 of wheel 8.

The conversion kit according to the invention comprises only few components, which can be assembled in a fast and simple way. Preferably, the components are made of metal, particularly light metal, and therefore are very stable while at the same time having a low weight. The conversion kit can be realised with different drives A (not shown). In order to mount drive A, a corresponding seat 47 and a fixing element 48, for example a wing bolt or the like, is provided on support 14 or shaft support 18. Thus, drive A is inserted into seat 47 and is fixed by means of fixing element 48. Therefore, drive A can be removed easily, such that it is prevented from being stolen or vandalised, for example when parking the bicycle. In case of an electric drive A, the required battery B (not shown) can be mounted to the other support 13 or shaft support 17 by means of a corresponding seat 49 and a corresponding fixing element 50.

Depending on the application, the conversion kit can be provided with various drives A being different in size and power.

The following FIGS. 3 to 6 show different stages of converting a non-driven wheel 8 of a bicycle into a wheel 8 driven by drive A. According to FIG. 3, wheel 8 is removed by loosening axle nuts 6, 7. For reasons of clarity, only hub 9 seated rotatably on axle 5 is shown, without corresponding spokes 10, rim 11 and tyre 12. Afterwards, axle 5 is removed from hub 9 together with the ball bearings (not shown) seated therein.

Figure 4:
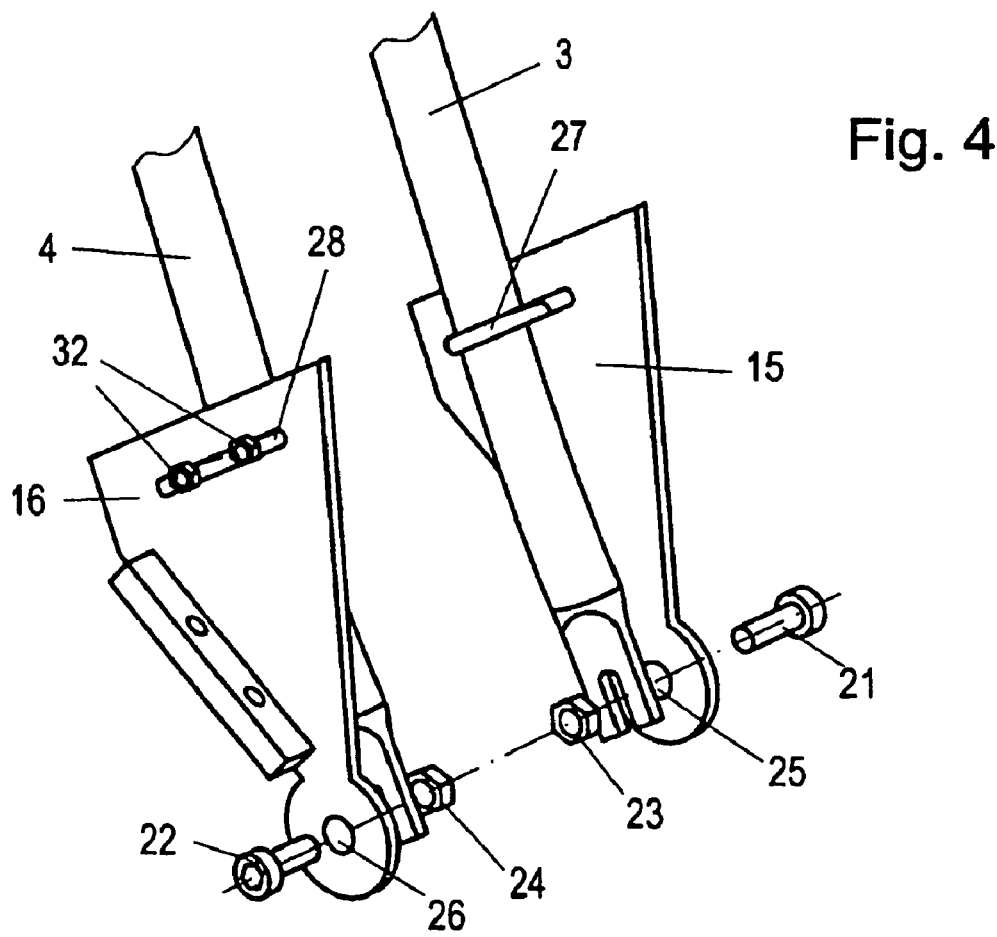

According to FIG. 4, the two fork supports 15, 16 are mounted to the fork blades 3, 4 by means of screws 21, 22 and corresponding nuts 23, 24. Additionally, fork clamps 27, 28 can be used as a fixing means.

Figure 5:
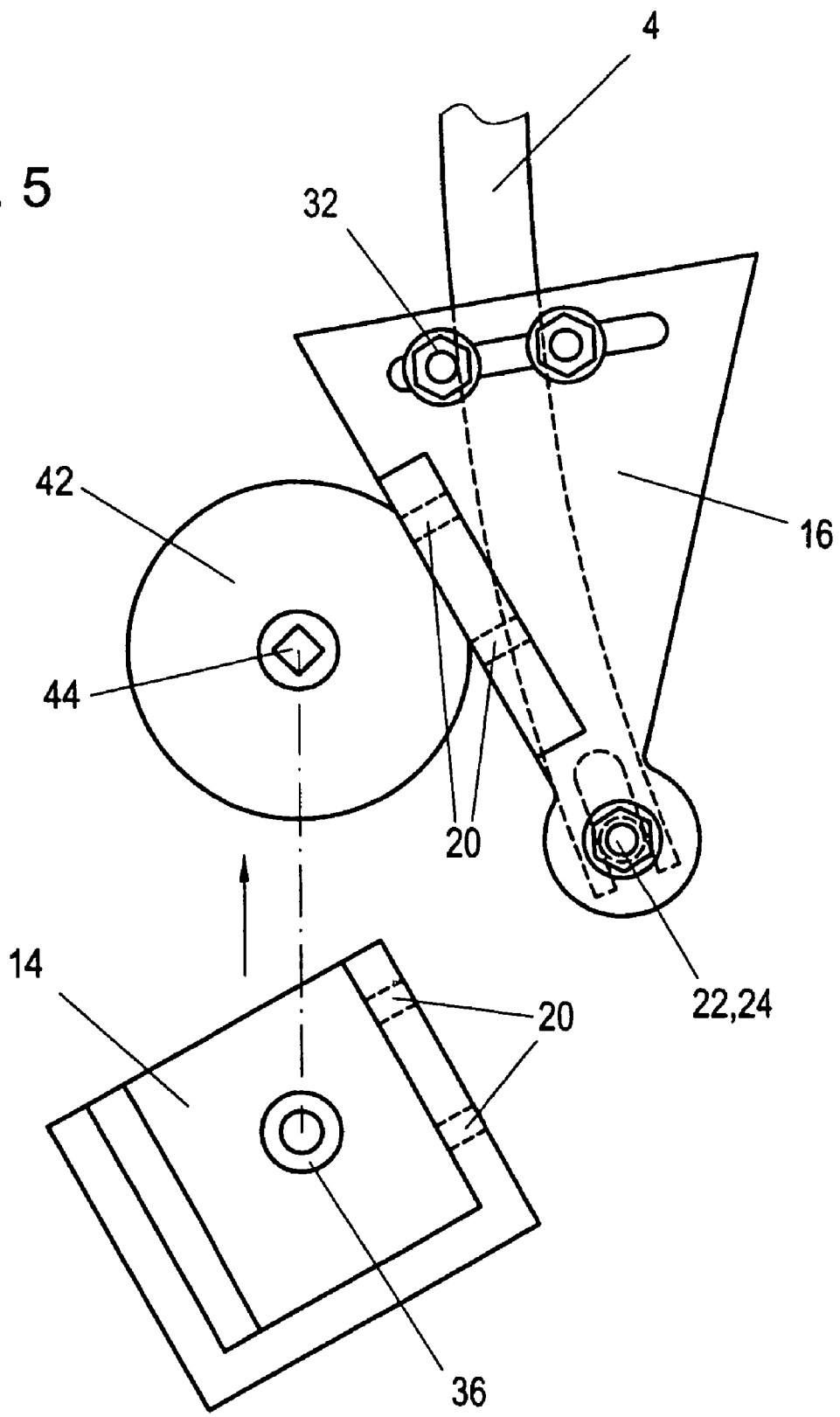

As can be seen schematically in FIG. 5, the shaft supports 17 and 18 and the bearings 35, 36 located therein are then fastened by means of corresponding screws, which are inserted through openings 20 of shaft support 17 and fork support 16. Shaft 37 is driven into hub 9 for being connected to hub 9 in co-rotation. Locating discs 41, 42 are located around the ends of shaft 37, and afterwards the ends of shaft 37 are arranged through the bearings 35, 36 of shaft 17, 18.

Figure 6:
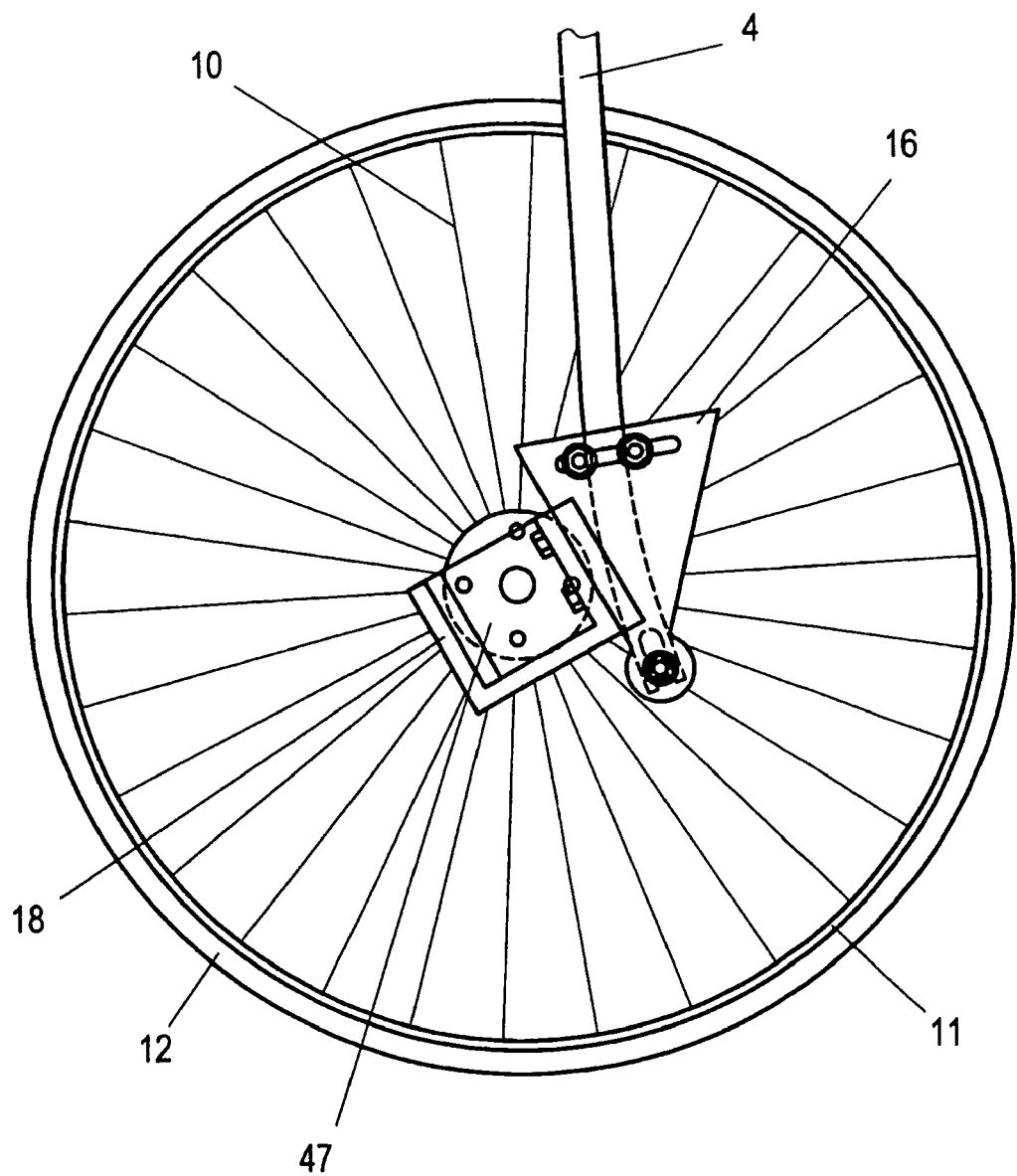

In FIG. 6, the completely converted bicycle is shown in side view, with seat 47 on the right shaft support 18 being destined for receiving drive A (not shown).

Figure 7:
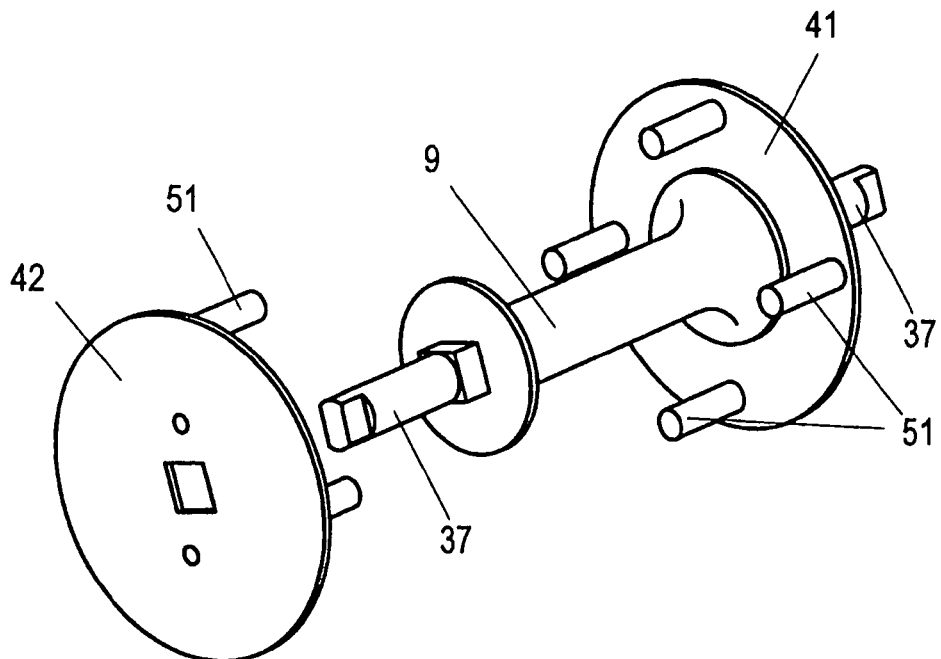
FIGS. 7 and 8 show two different embodiments of the connection in co-rotation between at least one shaft and the hub of the wheel to be driven.
Figure 8:
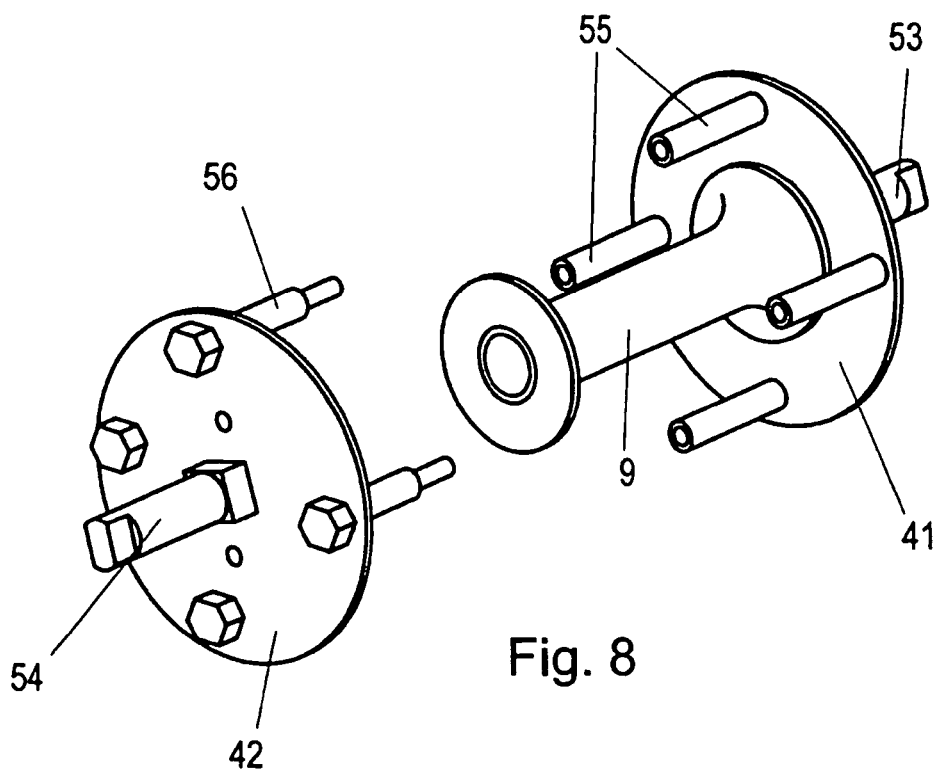

FIGS. 7 and 8 show two different embodiments for realising the connection of hub 9 in co-rotation with the at least one shaft 37. According to FIG. 7, a continuous shaft 37 is provided, which extends through hub 9. Locating discs 41, 42 are placed at the outer face of shaft 37. Thus, a connection in co-rotation of shaft 37 and hub 9, and therefore the complete wheel 8 (not shown) is established.

The alternative embodiment shown in FIG. 8 comprises two shaft parts 53, 54 coupled to or being produced in one piece with two locating discs 41, 42. The locating discs 41, 42 comprise corresponding sleeves 55 and screws 56 being inserted through the spokes 10 of wheel 8 and afterwards being coupled. Thus, the shafts 53, 54 are also connected in co-rotation with wheel 8. If drive A is coupled to the at least one shaft 37, 53 or 54, the rotational movement of drive A can be transmitted to shaft 37, 53, 54 and subsequently to hub 9 and wheel 8.

FIGS. 9 to 14 show different types of drives for a bicycle equipped with a kit according to the invention, shown in front and side views, respectively.

According to FIG. 9 and FIG. 10, the drive consists of an electric motor A being detachably mounted to support 14. On the left side of the wheel 8, battery B is mounted to support 13 for supplying power to electric drive A. The connecting cables are not shown. Drive A and battery B can be fixed by means of fixing elements 48 and 50.

FIGS. 11 and 12 show an alternative embodiment where another electric drive A and a slightly more powerful battery B are mounted.

Finally, FIGS. 13 and 14 show an embodiment of drive A in form of a combustion engine. The fuel tank can either be mounted directly to the combustion engine or can be mounted on the opposite side.

The invention claimed is:

1. A kit for converting a non-driven wheel of a bicycle into a wheel driven by a drive, the non-driven wheel having a hub for rotatably receiving an axle, the axle being mountable between first and second fork blades of a fork, the kit comprising:
   at least one shaft torsionally connectable in co-rotation with the hub of the wheel to be driven;
   a first support arrangeable at an outer face of the first fork blade, having a first connection element for connection with the first fork blade, and comprising a first bearing for rotatably seating the at least one shaft;
   a second support arrangeable at an outer face of the second fork blade, having a second connection element for connection with the second fork blade, and comprising a second bearing for rotatably seating the at least one shaft;
   a coupling device for coupling the at least one shaft to the drive; and
   a drive-detachment element for detachably mounting the drive, the drive-detachment element being located on the first support or on the second support;
   wherein via torsional connection between the at least one shaft and the hub the drive can drive the wheel.

2. The kit according to claim 1, wherein the first support further comprises:
   a first fork support connectable with a fork blade; and
   a first shaft support being able to be detachably coupled to the first fork support.

3. The kit according to claim 2, wherein the first fork support is coupled to the first shaft support via screws.

4. The kit according to claim 1, wherein the first connection element comprises at least one screw coupling.

5. The kit according to claim 4, wherein the first connection element further comprises:
   a U-shaped fork clamp having threaded ends for being detachably coupled with nuts; and
   an elongated hole located on the first support;
   wherein the U-shaped fork clamp can surround the first fork blade; and
   wherein the U-shaped fork clamp can be fixed via the elongated hole.

6. The kit according to claim 1, wherein the first and second bearings are ball bearings.

7. The kit according to claim 1, further comprising a battery-detachment element for detachably mounting a battery for an electric drive and located on the first support.

8. The kit according to claim 1, wherein the drive detachment element comprises a wing bolt.

9. The kit according to claim 1, wherein the at least one shaft is a continuous shaft extending from the first bearing to the second bearing.

10. The kit according to claim 9, wherein the continuous shaft has a center portion, a polygonal cross section in the center portion and an outer diameter slightly larger than an inner diameter of the hub of the wheel to be driven; and
wherein torsional connection in co-rotation of the continuous shaft and the hub of the wheel to be driven can be realized via an interference fit of the continuous shaft in the hub.

11. The kit according to claim 10, further comprising two locating discs having a seat for the continuous shaft, the seat corresponding to the polygonal cross section; and
wherein the two locating discs comprise teeth on a side of the two locating discs facing the hub for being torsionally connected in co-rotation with the hub.

12. The kit according to claim 1, wherein the at least one shaft comprises two shafts; and
wherein the kit further comprises two locating discs connectable to the two shafts, the two locating discs wheel-connection elements for torsional connection in co-rotation with the hub of the wheel to be driven, the wheel-connection elements being on a side of the two locating discs that can face the wheel to be driven.

13. The kit according to claim 12, wherein the wheel-connection elements comprise rods to be arranged between spokes of the wheel to be driven.

14. The kit according to claim 1, wherein the coupling device comprises a driving flange.

15. A bicycle having:
at least one wheel;
at least one drive;
a hub;
a fork comprising first and second fork blades; and
a kit coupling the at least one wheel to the at least one drive, the kit comprising:
at least one shaft torsionally connected in co-rotation with the hub;
a first support arranged at an outer face of the first fork blade, having a first connection element connected with the first fork blade, and comprising a first bearing rotatably seating the at least one shaft;
a second support arranged at an outer face of the second fork blade, having a second connection element connected with the second fork blade, and comprising a second bearing rotatably seating the at least one shaft;
a coupling device coupling the at least one shaft to the at least one drive; and
a drive-detachment element located on the first support or on the second support;
wherein via the drive-detachment element the at least one drive is detachably mounted to the first support or to the second support; and
wherein via the torsional connection between the at least one shaft and the hub the at least one drive can drive the wheel.

16. The bicycle according to claim 15, wherein the at least one wheel is a front wheel.

17. The bicycle according to claim 15, wherein the at least one drive comprises an electric motor and a corresponding battery.

18. The bicycle according to claim 15, wherein the at least one drive comprises a combustion engine and a fuel supply.

19. A method for converting a non-driven wheel of a bicycle into a wheel able to be driven by a drive, the non-driven wheel having a hub for rotatably receiving an axle, the axle being mountable between first and second fork blades of a fork, the method comprising steps of:
removing the non-driven wheel from the fork;
mounting a first support to the first fork blade the first support comprising a first bearing;
mounting a second support to the second fork blade, the second support comprising a second bearing;
torsionally connecting at least one shaft with the hub of the non-driven wheel in co-rotation, the at least one shaft being located between the first and second bearings;
coupling the at least one shaft to the drive; and
mounting the drive to the first support or to the second support in a detachable manner via a drive-detachment element disposed on the first support or on the second support;
wherein via the torsional connecting of the at least one shaft to the hub the at least one drive can drive the wheel.

20. The method according to claim 19, further comprising a step of:
removing the axle from the hub of the non-driven wheel;
wherein the torsional connecting of the at least one shaft with the hub of the non-driven wheel in co-rotation occurs in that the at least one shaft has an outer diameter slightly larger than an inner diameter of the hub and is pressed into the hub.

21. The method according to claim 19, further comprising a step of:
removing the axle from the hub of the non-driven wheel;
wherein the torsional connecting of the at least one shaft with the hub occurs in that two locating discs coupled to the at least one shaft are torsionally connected to the hub of the non-driven wheel in co-rotation.

* * * * *

UNITED STATES PATENT AND TRADEMARK OFFICE
CERTIFICATE OF CORRECTION

| | |
|---|---|
| PATENT NO. | : 8,220,578 B2 |
| APPLICATION NO. | : 12/449039 |
| DATED | : July 17, 2012 |
| INVENTOR(S) | : Kerschgens Long |

Page 1 of 1

It is certified that error appears in the above-identified patent and that said Letters Patent is hereby corrected as shown below:

In particular, in Column 7, line 23 (Claim 12) after "discs", please insert the word: --having--.

In Column 8, line 22 (Claim 19) after "blade", please insert: --,--.

Signed and Sealed this
Thirtieth Day of October, 2012

David J. Kappos
*Director of the United States Patent and Trademark Office*